M. B. GIBERSON.
VEHICLE WHEEL.
APPLICATION FILED SEPT. 23, 1915.
1,192,886.
Patented Aug. 1, 1916.
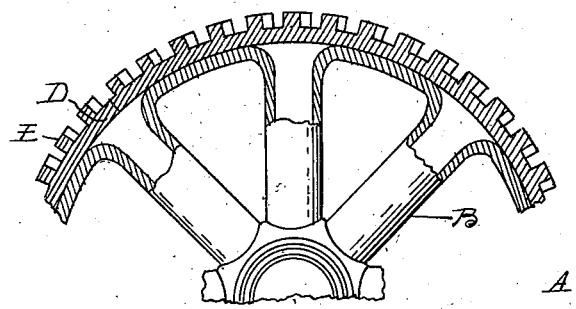
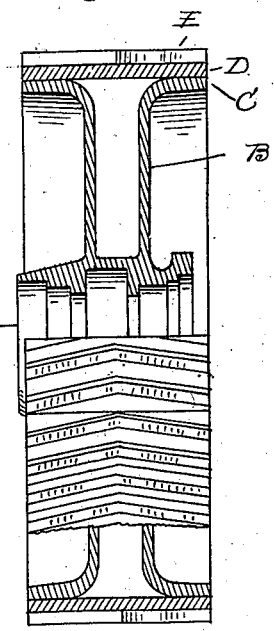
Inventor
Mason B. Giberson
By Whittemore Hulbert + Whittemore
Attorney

UNITED STATES PATENT OFFICE.

MASON B. GIBERSON, OF DETROIT, MICHIGAN, ASSIGNOR TO THOMAS H. SIMPSON, OF DETROIT, MICHIGAN.

VEHICLE-WHEEL.

1,192,886.  Specification of Letters Patent.  Patented Aug. 1, 1916.

Application filed September 23, 1915. Serial No. 52,290.

*To all whom it may concern:*

Be it known that I, MASON B. GIBERSON, a citizen of the United States of America, residing at Detroit, in the county of Wayne and State of Michigan, have invented certain new and useful Improvements in Vehicle-Wheels, of which the following is a specification, reference being had therein to the accompanying drawings.

The invention relates to vehicle wheels formed from malleable cast metal, and the invention has particular reference to the construction of rim provided with a reinforced serrated tread.

In the drawings: Figure 1 is a cross section through the wheel; Fig. 2 is a section in a plane at right angles to Fig. 1.

A is the hub portion, B are radial hollow spoke portions, and C is a rim portion, all being formed integral and suitably proportioned to distribute and equalize the stresses incident to the cooling of the cast metal.

To provide a durable tread surface, and also to reinforce and strengthen the wheel, I form a serrated tread D of a rolled steel bar. This bar is bent into annular form, having its ends welded together, and the ring thus formed is then shrunk or pressed upon the rim C, as shown in Figs. 1 and 2.

This will form a strong joint between the cast and wrought metal parts, while the greater tensile strength of the latter will increase the strength of the structure. The serrations or cross ribs E may be readily rolled into the bar and will have the effect of increasing the traction.

What I claim as my invention is:

1. A wheel, comprising a hub portion, hollow spoke portions and rim portion, formed integral of cast metal, and an annular tread portion formed of a rolled wrought metal bar having cross ribs or serrations formed therein, said tread portion being shrunk upon said rim.

2. A vehicle wheel, comprising a hub portion, hollow spoke portions and rim portion, formed integral of cast metal, and a reinforcing annular tread portion formed of wrought metal having cross ribs or serrations rolled therein, said tread being shrunk upon said rim.

In testimony whereof I affix my signature in presence of two witnesses.

MASON B. GIBERSON.

Witnesses:
 JAMES P. BARRY,
 PHYLLIS COBURN.

Copies of this patent may be obtained for five cents each, by addressing the "Commissioner of Patents, Washington, D. C."